United States Patent
Duszka

[15] 3,642,154
[45] Feb. 15, 1972

[54] LOADING DEVICE FOR TRUCKS

[72] Inventor: Stephen Duszka, 340 New England Terrace, Orange, N.J. 07050

[22] Filed: Aug. 26, 1970

[21] Appl. No.: 67,078

Related U.S. Application Data

[63] Substitute for Ser. No. 711,721, Mar. 8, 1968, abandoned.

[52] U.S. Cl. ...................... 214/83.24, 214/83.3, 214/516, 198/218
[51] Int. Cl. ...................................................... B60p 1/00
[58] Field of Search ............ 214/83.3, 516, 512, 38 C, 38 D, 214/83.24; 198/218, 219, 222

[56] References Cited

UNITED STATES PATENTS

| | | | |
|---|---|---|---|
| 3,346,132 | 10/1967 | Duszka | 214/516 |
| 3,529,481 | 9/1970 | Budzyn | 214/516 X |

*Primary Examiner*—Albert J. Makay
*Attorney*—Polachek & Saulsbury

[57] ABSTRACT

A self-loading device built into a truck body for transferring freight from one place to another on the truck, the device, including an under floor carriage that protrudes through the body to lift freight off the floor and deposit it at another area, on the truck.

4 Claims, 10 Drawing Figures

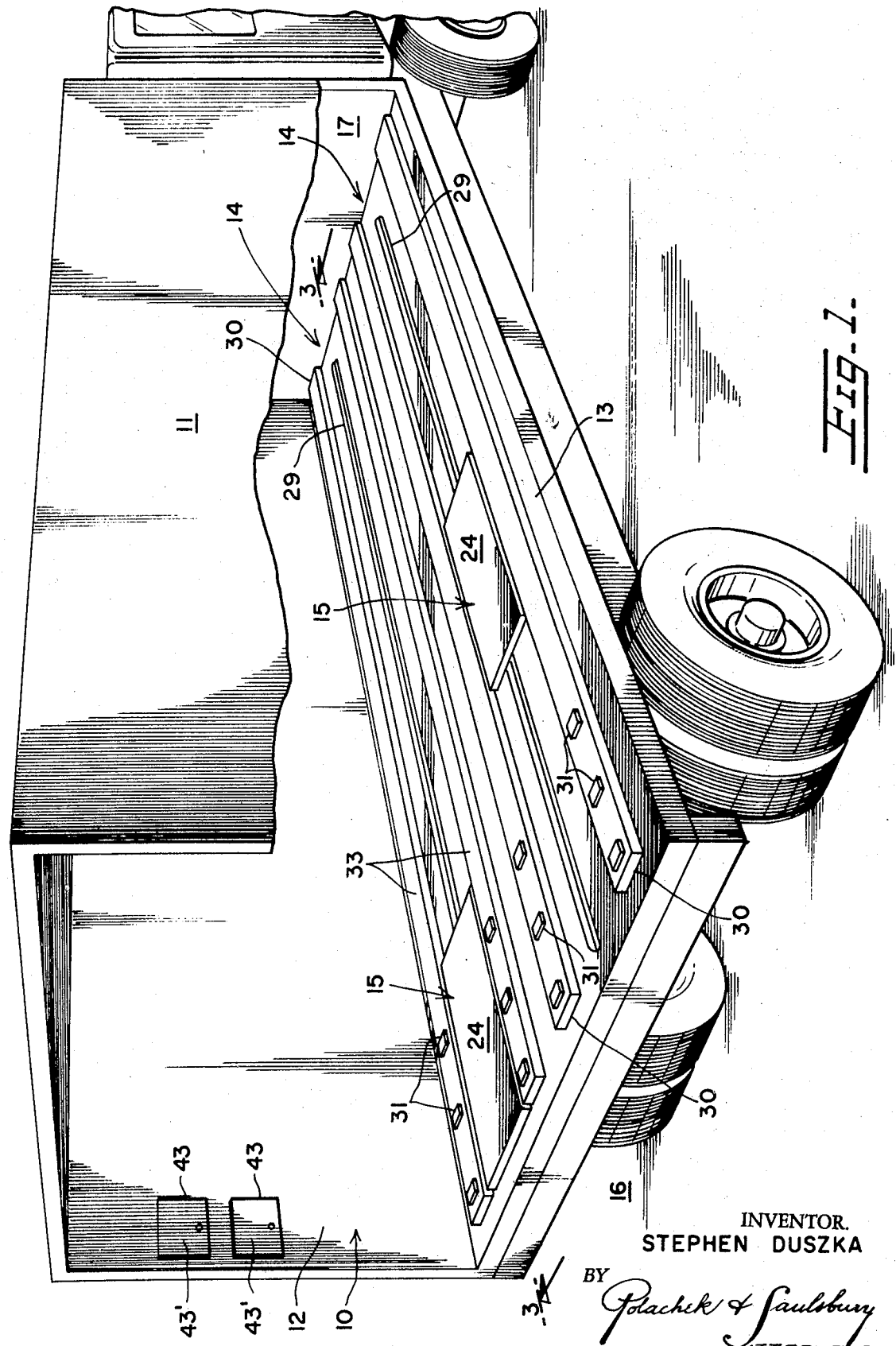

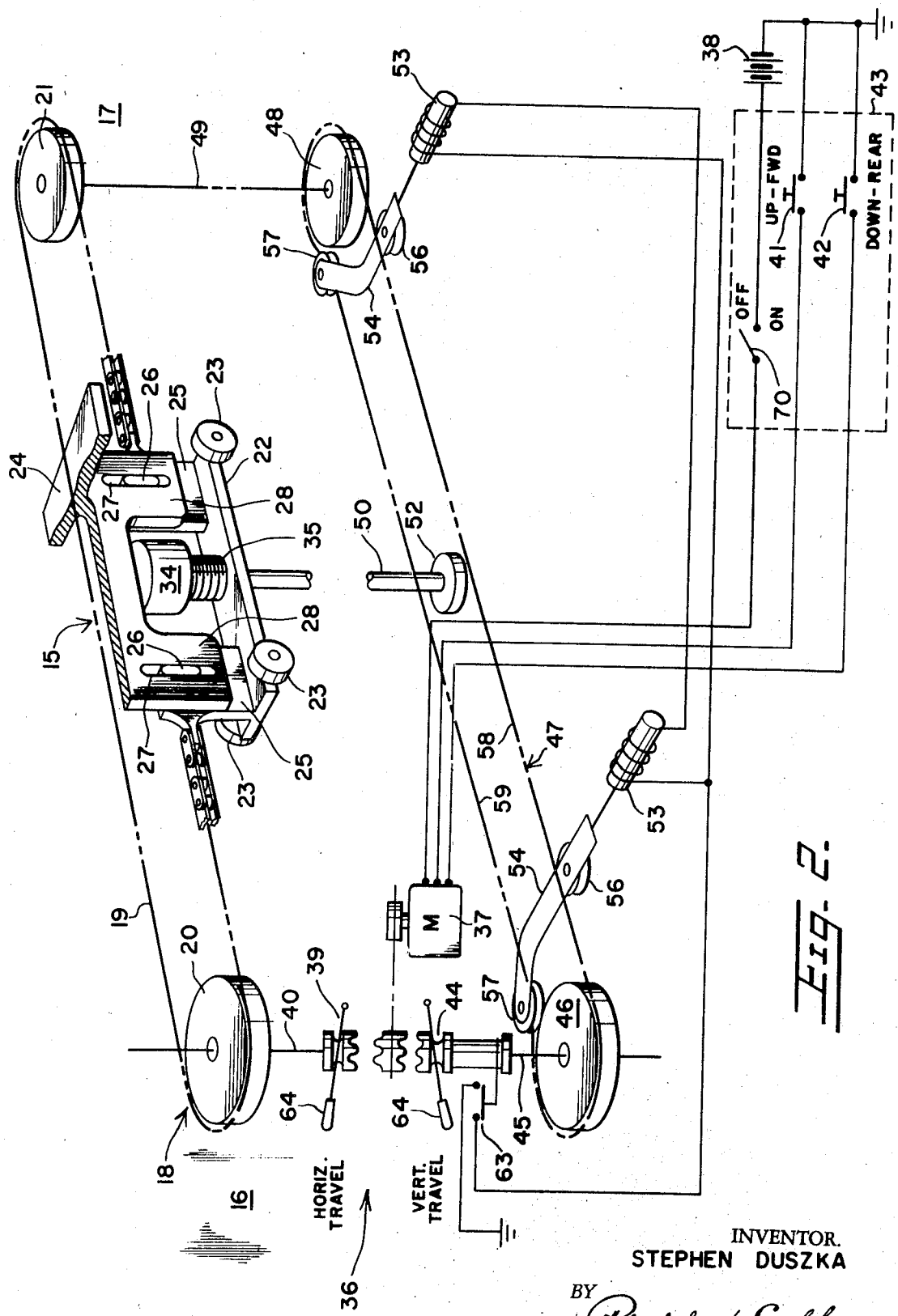

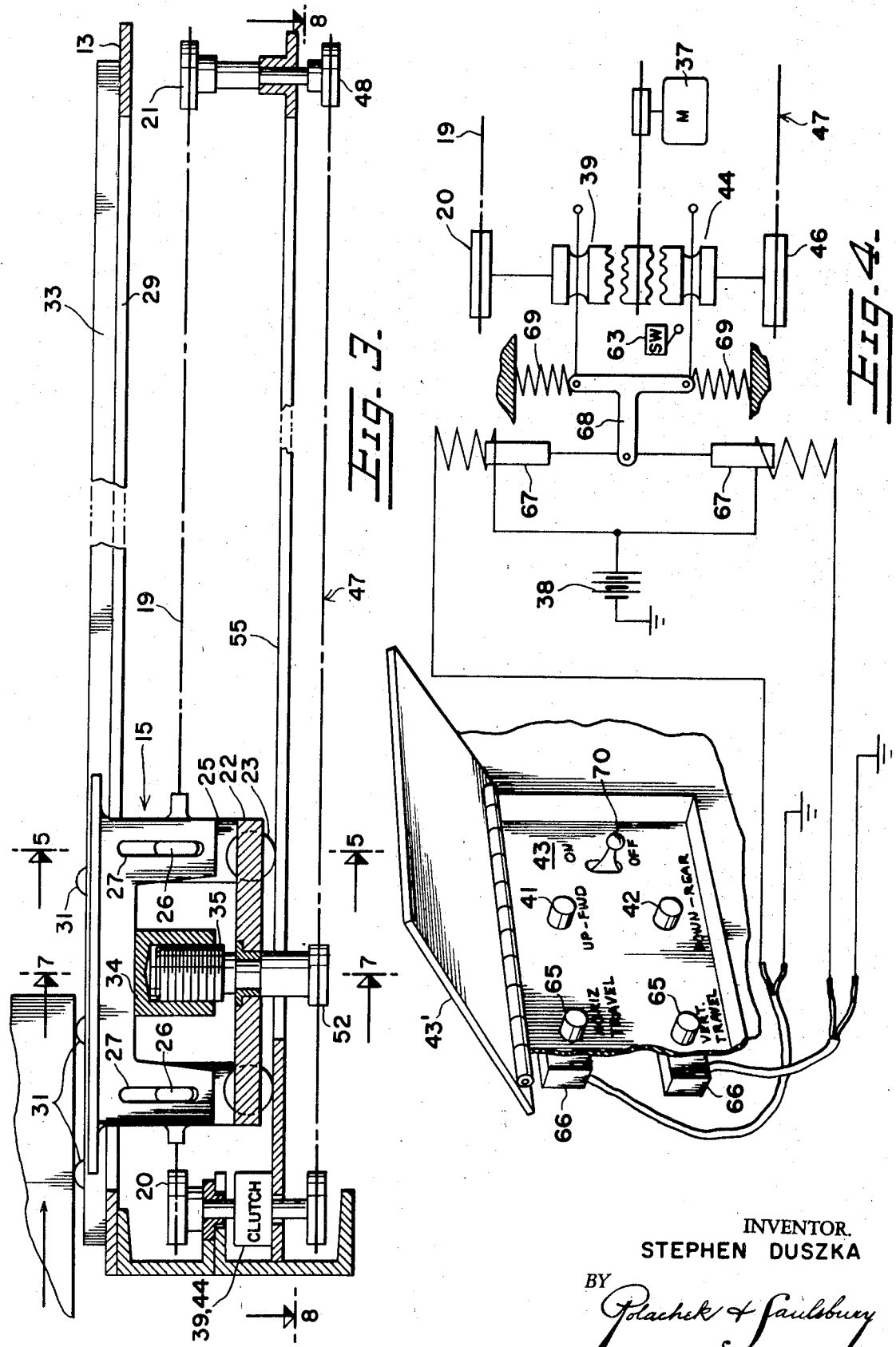

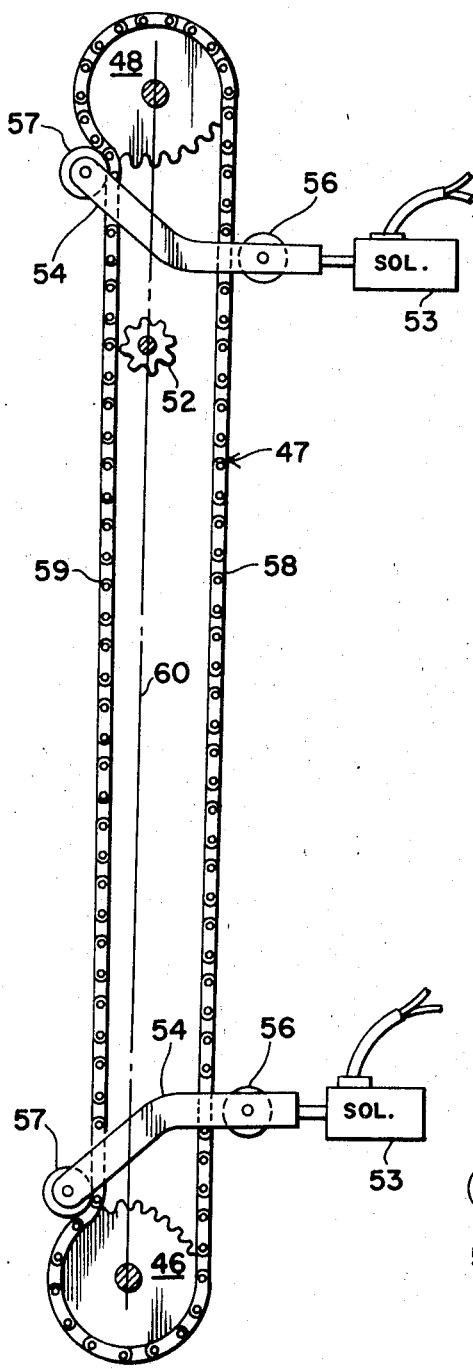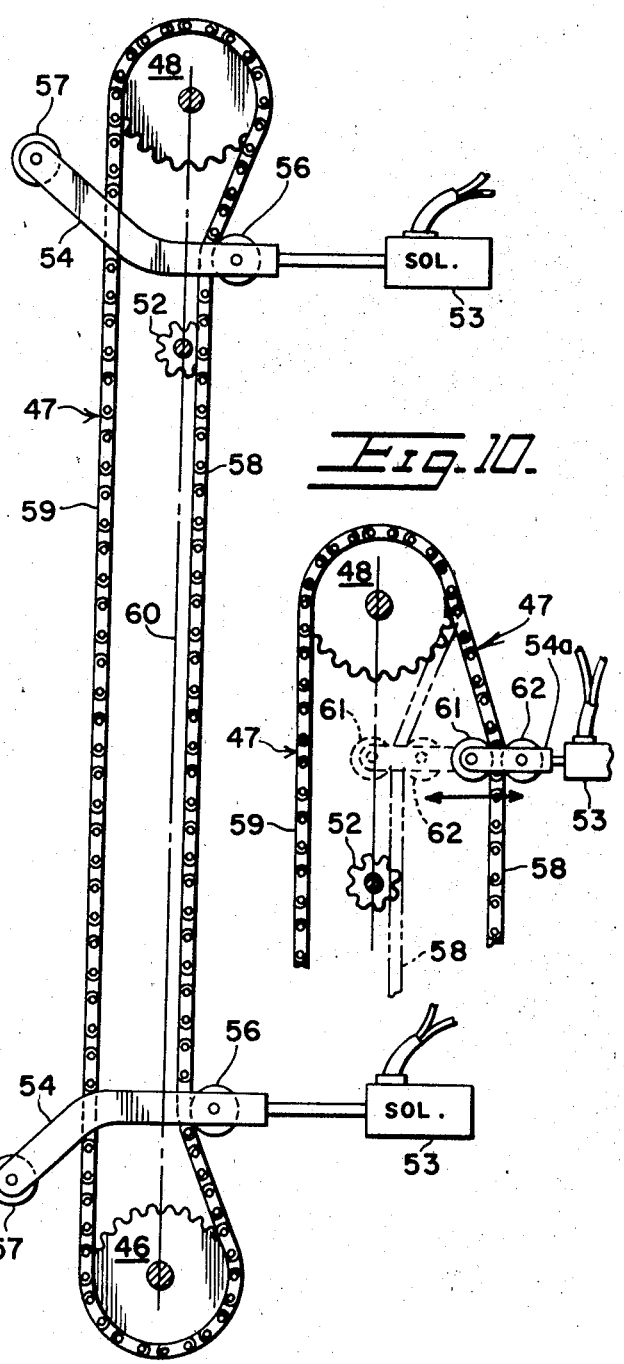

LOADING DEVICE FOR TRUCKS

This application describes and claims subject matter described and claimed in my application, Ser. No. 711,721, filed Mar. 8. 1968, now abandoned.

This invention relates generally to automotive trucks and trailers such as are used for transporting freight. More specifically, it relates to freight loading mechanism used for relocating freight on a truck or trailer.

A principal object of the present invention is to provide a truck loading device having means for moving horizontally to transfer goods and freight from one area of the truck bed or body to another.

Another object is to provide a truck loading device having means for lifting an item of freight from the truck floor, transporting it in space above the floor, and then lowering it to exhausting, floor and the destination.

Yet another object is to provide a truck lifting device which is designed to mechanically move goods between opposite ends of a truck body or bed during loading or unloading, and thus replace exhausting, time-consuming and expensive manual labor.

Yet another object is to provide a truck loading device that can be built into the floor of the body or bed of a truck or trailer and which will not in any way interfere with normal operation of the vehicle.

Yet another object is to provide a truck loading device which can be remotably operated by a single individual to move heavy objects of freight between opposite ends of the vehicle during loading and unloading.

Yet a further object is to provide a truck loading device that can be moved beneath standing objects upon the truck floor so to selectively work within otherwise blocked off areas to maneuver freight.

Yet a further object is to provide a truck loading device that can be readily installed into the body or bed of existing truck vehicles under production.

Other objects are to provide a truck loading device which is simple in design, inexpensive to manufacture, rugged in construction, easy to use and efficient in operation.

These and other objects will be readily evident upon a study of the following specifications and the accompanying drawings wherein:

FIG. 1 is a rear perspective view of a truck shown incorporating the present invention.

FIG. 2 is a diagrammatic view showing the mechanical principles and the electrical circuit of the invention.

FIG. 3 is a cross-sectional view taken on line 3—3 of FIG. 2.

FIG. 4 is a diagrammatic view of a refinement of the controls shown in FIG. 2.

FIG. 8 is a cross-sectional view taken on line 8—8 of FIG. 3.

FIG. 9 is a view similar to FIG. 8, shown in an alternate position, and

FIG. 10 is a fragmentary view similar to FIG. 8, showing a modified construction.

Figure 5:
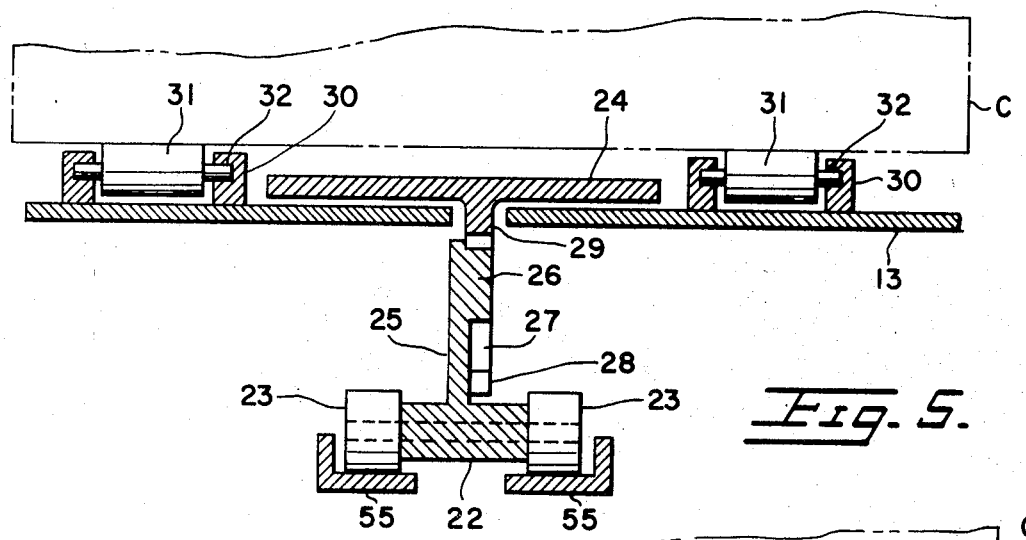
FIG. 5 is a cross-sectional view taken on line 5—5 of FIG. 3.
Figure 6:
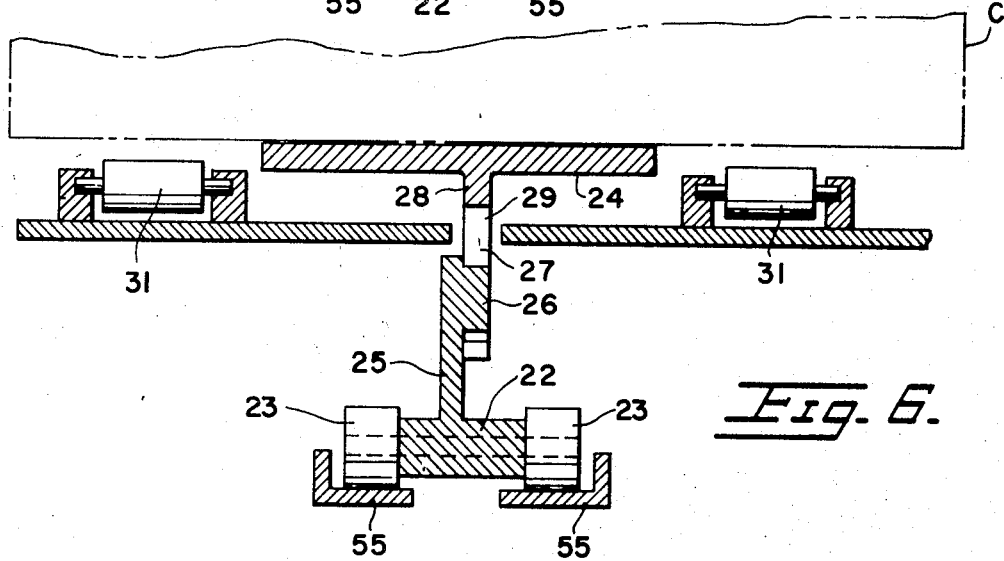
FIG. 6 is a view similar to FIG. 5 shown in an alternate position.
Figure 7:
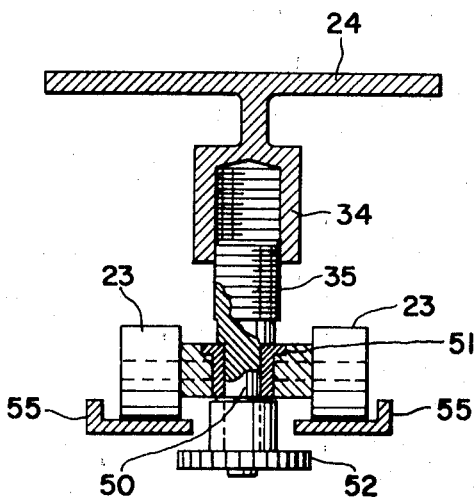
FIG. 7 is a cross-sectional view taken on line 7—7 of FIG. 3.

Referring now to the drawing in detail, the reference numeral 10 represents a truck loading device according to the present invention wherein there is a truck or trailer 11 having a body 12 or bed (not shown) having a floor 13 that incorporates the present invention for mechanically moving freight objects between opposite ends of the truck body.

The floor is provided with a plurality of loading systems, 14, each of which includes a carriage 15 that is horizontally movable between the rear and front ends 16 and 17 of the truck body.

Each system includes a mechanism 18 located on the underside of the floor 13. The mechanism 18 includes a chain 19 for moving the carriage horizontally, the chain traveling around a sprocket 20 at the rear end of the truck and a sprocket 21 at the front end; the chain having the carriage secured thereto, so to travel therewith rearwardly and forwardly.

The carriage 15 is comprised of a chassis 22 mounted upon wheels 23, the carriage supporting a vertically slidable platform 24. The carriage includes upstanding walls 25 having sidewardly extending lugs 26 that fit into slots 27 of depending walls 28 of the underside of platform 24. The wall 28 extends upwardly through a slot 29 in the floor 13, the slot extending the general length of the floor. The platform 24 accordingly is located above the floor 13 where it may engage the underside of freight packages or crates C intended to be moved between the loading end of the truck and the storage area. As is shown in FIGS. 1 and 5, the platform is fitted between stringers 30 upon which the creates normally rest while the truck is in movement, the stringers accordingly being thicker than the platform so to extend higher. Several rollers 31 rotatable about pins 32 are carried at the rear end of each stringer, the rollers extending above the stringer upper side 33 so to allow crates to be rolled thereupon into and out of the truck entrance.

In order to move freight between areas within the truck, it is essential that the platforms raise the crates above the level of the stringers, then transport the same horizontally and then redeposit them at their new locations upon the stringers again. Accordingly to raise the platforms, a threaded socket 34 is secured to the underside of platform 24, the socket threadingly engaging a rotatable screw 35 to cause the platform to move vertically.

The present invention includes a control system 36 for selectively operating the mechanism 18, to cause the carriage to move horizontally forward or rearward and the platform to move vertically upward or downward. The control system, as shown in FIG. 2, includes a three-pole, two-directional motor 37 that is electrically powered from the truck battery 38, the motor driving through a clutch 39 to selectively rotate a shaft 40 on which the sprocket 20 is secured. A pushbutton 41 and a pushbutton 42 on each of a pair of control panels 43 conveniently mounted on the truck, control the motor direction of rotation so as to make the carriage travel forwardly or rearwardly. Each panel is preferably protected by a hinge door 43'. The motor 37 also drives selectively through a clutch 44 to cause the platform 24 to travel vertically. The clutch 44 causes rotational power to be delivered to a shaft 45 having a sprocket 46 secured thereto. An endless chain 47 passes around the sprocket 46 and a sprocket 48 freely rotatable on a shaft 49 carrying also freely rotatable sprocket 21. The screw 35 of the carriage is formed on the upper end of a shaft 50 supported rotatably free in a bearing 51 in the chassis 22, the lower end of shaft 50 having a sprocket 52 secured thereto. A pair of solenoids 53 located near the opposite ends of the truck operate to actuate arms 54 that cause the chain 47 to be brought into engagement with the sprocket 52 regardless of the location of the carriage along a track 55 upon which the wheels 23 may travel, as is best shown in FIG. 8 and 9. Each arm includes rollers 56 and 57, the roller 56 displacing sidewardly a leg 58 of the chain 47 so to cause it to engage the sprocket 52. The other roller 57 displaces sidewardly the leg 59 of the same chain 47 so to take up the slack in the chain when it is not in engaging position with the sprocket 52.

The sprocket 52 travels along a centerline 60 passing through the centers of sprockets 46 and 48 and in order that the leg 58 of the chain be permitted to engage the sprocket 52, the rollers 57 are located relatively closer to the sprockets 46 and 48 than the rollers 56 thus causing a more acute angle to be formed in the chain when urged by rollers 57 than when urged by rollers 56. Thus the leg 59 with the acute angles at each end cannot engage the sprocket 52.

In a modified construction, shown in FIG. 10, the arm 54a is designed having rollers 61 and 62 between which leg 58 of chain 47 is guided. In this modification the arm influences only the leg 58 to be displaced between the positions illustrated by solid lines and dotted lines, in FIG. 10.

In order to keep the controls in the simplest design, with minimum manually operative parts, the solenoids 53 are automatically actuated when the clutch 44 is engaged. The clutch 44 causes a switch 63 to close an electrical circuit between the battery and solenoids 53, as shown in FIG. 2.

In a further improved construction shown in FIG. 4, the clutches 39 and 44 shown in manually moved position by the handles 64 in FIG. 2 are here operated by pushbuttons 65 that actuate switches 66 to selectively close either of the electric circuits to the solenoids 67 to pivot the clutch unit 68 in the selected direction. Compression springs 69 normally maintain the clutch unit in a neutral position as shown.

An off-on switch 70 on the control panel serves to control power to the loading mechanism.

In operative use, an operator may conveniently stand at the control panel where he may view the freight operation and push control buttons, to selectively raise the platform below a crate, then move it horizontally to its storage position in the vehicle, then lower the platform and return the carriage to its starting position for transporting another crate in a similar operation.

While various changes may be made in the details construction, it is understood that such changes will be within the spirit and scope of the present invention.

What is claimed is:

1. In a loading device for automotive trucks or trailers, the combination of a vehicle body having a floor, a plurality of loading systems on said floor, each said system including freight moving mechanism below said floor, said mechanism includes a carriage movable horizontally below said floor, said floor having an elongated slot therethrough, said carriage supporting a platform above said floor, said platform having a vertical wall therebelow extending through said floor slot for support on said carriage, and means on said platform vertically movable between operative and unoperative positions, to lift or lower an item of freight respectively to said floor and to clear said floor when said carriage transports said item of freight horizontally from one area in said vehicle body to another, said mechanism includes a control system having means for selectively moving said carriage forwardly or rearwardly, and means for selectively moving said platform upwardly or downwardly, both said means being controlled from a remotely positioned control panel, said means for said carriage travel comprises a first pair of spaced-apart sprockets, means for moving said sprockets, a chain around said sprockets, said chain being connected to said carriage to travel longitudinally forward or rearward between said sprockets, said carriage comprises a chassis supported on wheels, said chassis having upstanding walls having sideward extending lugs engageable in slots in said platform vertical wall to allow relative vertical movement of said platform relative to said chassis, and said platform having a threaded socket on its underside engaged with an upward extending threaded end of a rotatable shaft, rotatably carried on said chassis.

2. In a loading device for automotive trucks or trailers, the combination as set forth in claim 1, wherein said means for causing said platform to travel vertically includes a control system comprised of a sprocket at the lower end of said chassis shaft, an endless chain carried between a second pair of spaced-apart sprockets, said endless chain selectively engaging said shaft sprocket, a three-pole, two-directional electric motor, a shaft driven thereby, and a pair of clutches operatively engaging said shaft, one of said clutches operatively connecting said motor to said first pair of sprockets, and the other said clutch operatively connecting said motor to said second pair of sprockets.

3. In a loading device for automotive trucks or trailers, the combination as set forth in claim 2, wherein said endless chain around said second pair of sprockets is sidewardly urged to engage said shaft sprocket by a plurality of solenoids each having an arm to urge a leg of said endless chain against said shaft sprocket.

4. In a loading device for automotive trucks or trailers, the combination as set forth in claim 2, and separate handles for actuating the clutches.

* * * * *